United States Patent
Li et al.

(12) 
(10) Patent No.: US 6,694,690 B2
(45) Date of Patent: Feb. 24, 2004

(54) CONCRETE CONSTRUCTIONS EMPLOYING THE USE OF A DUCTILE STRIP

(75) Inventors: Victor C. Li, Ann Arbor, MI (US); Jun Zhang, Beijing (CN)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/902,054

(22) Filed: Jul. 10, 2001

(65) Prior Publication Data

US 2002/0046524 A1 Apr. 25, 2002

Related U.S. Application Data

(60) Provisional application No. 60/217,008, filed on Jul. 10, 2000.

(51) Int. Cl.[7] .............................................. E04B 1/68
(52) U.S. Cl. ............................ 52/396.04; 52/396.02; 52/396.05
(58) Field of Search ...................... 52/396.02, 396.04, 52/396.05, 589.1; 404/42

(56) References Cited

U.S. PATENT DOCUMENTS

| | | | |
|---|---|---|---|
| 3,638,377 A | | 2/1972 | Caspe |
| 3,785,741 A | * | 1/1974 | Lodige ........................ 404/51 |
| 3,903,587 A | * | 9/1975 | Boiardi ........................ 29/418 |
| 4,023,324 A | * | 5/1977 | Majeske ................. 52/204.591 |
| 4,407,676 A | | 10/1983 | Restrepo |
| 4,548,009 A | * | 10/1985 | Dahowski .................... 404/48 |
| 4,587,773 A | | 5/1986 | Valencia |
| 4,636,345 A | | 1/1987 | Jensen et al. |
| 4,644,714 A | | 2/1987 | Zayas |
| 4,799,339 A | | 1/1989 | Kobori et al. |
| 4,815,886 A | * | 3/1989 | Madsen ........................ 403/28 |
| 4,881,350 A | | 11/1989 | Wu |
| 4,883,250 A | | 11/1989 | Yano et al. |
| 4,922,667 A | | 5/1990 | Kobori et al. |
| 5,043,033 A | | 8/1991 | Fyfe |
| 5,502,932 A | | 4/1996 | Lu |

(List continued on next page.)

FOREIGN PATENT DOCUMENTS

| | | |
|---|---|---|
| CH | 630 131 | 5/1982 |
| DE | 1 279 918 | 10/1968 |
| EP | 0 448 577 B1 | 11/1993 |
| EP | 0 699 808 A1 | 6/1996 |

OTHER PUBLICATIONS

H. Fukuyama, Y. Masuda, Y. Sonobe, and M. Tanigaki, "Structural Performances of Concrete Frame Reinforced with FRP Reinforcement," Non–Metallic (FRP) Reinforcement for Concrete Structures, 1995, E & FN Spon, England.

(List continued on next page.)

*Primary Examiner*—Ramon O. Ramirez
*Assistant Examiner*—Amy J. Sterling
(74) *Attorney, Agent, or Firm*—Brooks Kushman P.C.

(57) ABSTRACT

The present invention relates to a concrete construction that comprises a concrete slab and a ductile strip adjacent the slab. The ductile strip comprises an engineered cementitious composite of cementitious material and reinforcing fibers with the ductile strip being directly bonded to the slab. The present invention also relates to a method of making or repairing a concrete construction, the method comprises providing a ductile strip adjacent a concrete slab, wherein the ductile strip is made of an engineered cementitious composite comprising cementitious material and hydrophilic and/or hydrophobic reinforcing fibers. The present invention further relates to a roadbed or building floors suitable for vehicular traffic, the roadbed comprises a plurality of slabs and ductile strips comprising an engineered cementitious composite of cementitious material and reinforcing fibers.

42 Claims, 1 Drawing Sheet

U.S. PATENT DOCUMENTS

| | | | |
|---|---|---|---|
| 5,660,007 A | | 8/1997 | Hu et al. |
| 5,675,943 A | | 10/1997 | Southworth |
| 5,797,231 A | * | 8/1998 | Kramer ........................ 404/52 |
| 5,983,582 A | | 11/1999 | Vugrek |
| 5,988,648 A | * | 11/1999 | Schmid ...................... 277/316 |
| 6,012,256 A | | 1/2000 | Aschheim |
| 6,039,503 A | * | 3/2000 | Cathey ......................... 404/67 |
| 6,052,964 A | * | 4/2000 | Ferm et al. ................... 404/64 |
| 6,060,163 A | | 5/2000 | Naaman |
| 6,106,945 A | | 8/2000 | Mayahara et al. |
| 6,151,790 A | * | 11/2000 | Whitfield ..................... 33/533 |
| 6,189,286 B1 | | 2/2001 | Seible et al. |
| 6,194,051 B1 | | 2/2001 | Gagas et al. |
| 6,237,303 B1 | | 5/2001 | Allen et al. |
| 6,276,106 B1 | * | 8/2001 | Shotton et al. ............. 405/267 |
| 6,389,774 B1 | * | 5/2002 | Carpenter .................... 404/52 |
| 6,398,998 B1 | * | 6/2002 | Krenchel et al. ............. 264/70 |
| 6,434,904 B1 | * | 8/2002 | Gutschmidt et al. .......... 33/533 |
| 2003/0150364 A1 | * | 8/2003 | Orange et al. .............. 106/802 |

OTHER PUBLICATIONS

Z. Lin, T. Kanda and V. C. Li, "On Interface Property Characterization and Performance of Fiber-Reinforced Cementitious Composites," Concrete Science and Engineering, Sep. 1999, pp. 173–184, vol. 1, RILEM Publications S.A.R.L.

V. C. Li, "Metal-Like Concrete for Constructed Facilities," PowerPoint presentation presented in Ann Arbor, Michigan, in May, 2000.

V. C. Li and C. Leung, "Steady-State and Multiple Cracking of Short Random Fiber Composites," Journal of Engineering Mechanics, Nov. 1992, pp. 2246–2264, vol. 118, No. 11, ASCE.

* cited by examiner

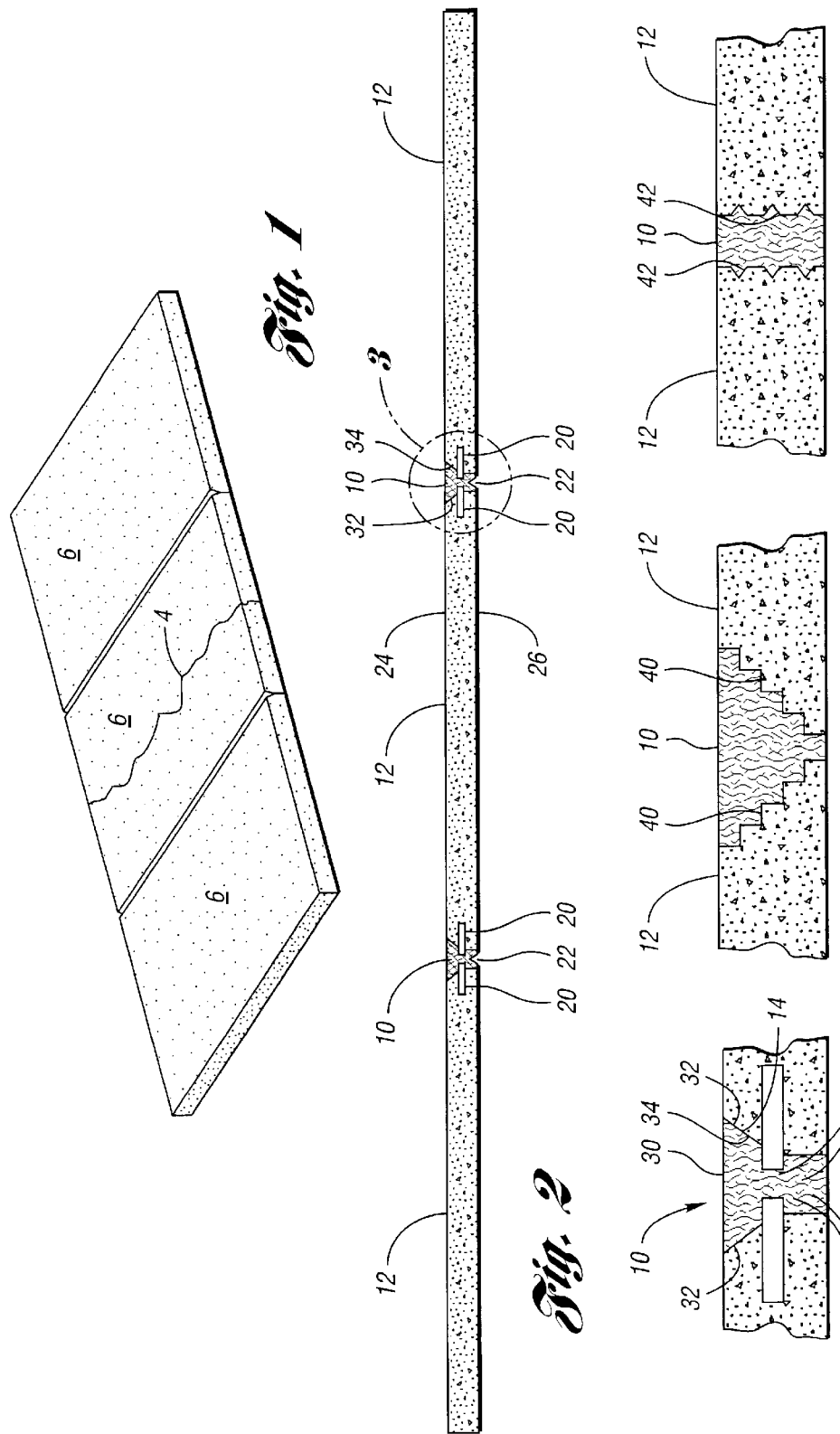

CONCRETE CONSTRUCTIONS EMPLOYING THE USE OF A DUCTILE STRIP

CROSS-REFERENCE TO RELATED APPLICATIONS

This application claims the benefit of U.S. provisional application Ser. No. 60/217,008 filed Jul. 10, 2000.

STATEMENT OF GOVERNMENT RIGHTS

The invention was made with government support under Grant No. 9872357 awarded by the NFS. The government has certain rights in this invention.

BACKGROUND OF THE INVENTION

1. Field of the Invention

The present invention relates to a construction and method for inhibiting the formation of cracks in concrete slabs, and more particularly relates to the use of a ductile strip comprising cementitious material and hydrophilic and/or hydrophobic fibers. The ductile strip is directly bonded between adjacent concrete slabs.

2. Background Art

Reinforced concrete slabs have been widely used in modern transportation engineering, such as highway and airport pavements and bridge decks. Reinforced concrete slabs are also used in buildings, such as parking garage and factory or warehouse flooring. The average service life of a concrete slab is determined by many factors including the initial design details, material properties, traffic load and frequency, environment, salt application, and the presence and effectiveness of protective systems and maintenance practices, among others. All these factors influence the development of cracks in concrete slabs during their use. Cracking in slabs reduces the load capacity of the slab, and has been linked to fatigue failure. Cracking may cause deterioration in ridability and durability.

Concrete shrinkage and expansion is a principal reason for the initial formation of cracks in concrete slabs. As temperature changes occur, concrete expands or contracts, resulting in the formation of stresses in concrete slabs. For instance, an increase in temperature can cause the concrete slab to expand, resulting in compressive stresses in the slab as it bears against neighboring slabs or other structures. Alternatively, decreasing temperatures can cause the concrete slab to shrink, resulting in tensile stresses in the slab. As the tensile stress produced by temperature and shrinkage attains the tensile strength of concrete, cracking occurs in the slab. Concrete typically has a tensile strain capacity of about 0.01–0.02%. A typical transverse crack 4 in concrete pavements 6 is shown in FIG. 1. Deterioration of concrete slabs is a common cause requiring repair, rehabilitation or replacement of pavement and bridge structures. Therefore, innovative technology for repair and for new construction of concrete slabs is urgently needed.

At present, there is no cost-effective, reliable way of preventing the occurrence of the before-mentioned transverse cracks in concrete slabs. At present, the shrinkage and temperature change induced cracking of slabs is prevented in concrete pavements by making transverse joints, i.e., manually initiating discontinuities of the pavement by reducing the section of the pavement at the joints by 20 to 25%. These joints enable the slabs to move under shrinkage strain or temperature gradient. The distance between two closest joints is normally around 4 to 6 meters. These manually induced cracks (i.e., joints) often become the main source of pavement deterioration. In addition, this kind of construction can result in an uncomfortable motorist ride due to the discontinuity in the concrete slabs. Even with such joints, transverse cracks have been found to occur.

Accordingly, it would be desirable to have a reliable and cost-effective concrete construction and method of making or repairing a concrete construction that inhibits the formation of stress related cracks in concrete slabs, while avoiding problems associated with the prior art.

SUMMARY OF THE INVENTION

The present invention pertains to the preparation of cementitious structures wherein the effects of tensile and compressive forces are minimized without resort to artificial joints between concrete slabs. As a result, ingress of deteriorating substances (i.e., salt water) is considerably reduced, while the smoothness of the surface is not unduly compromised. The process involves directly bonding a ductile, fiber-reinforced cementitious "expansion stip" between abutting concrete slabs or between a concrete slab and a supporting structure, i.e., a retaining wall, building wall, etc. The ductile strip useable with the present invention comprises an engineered cementitious composite of cementitious material and reinforcing fibers.

BRIEF DESCRIPTION OF THE DRAWINGS

FIG. 1 illustrates the typical transverse cracks found in prior art cementitious slabs, such as those found in a sidewalk;

FIG. 2 illustrates a concrete construction made in accordance with an embodiment of the present invention;

FIG. 3 illustrates an enlarged view of a section of the construction in FIG. 2;

FIG. 4 illustrates an embodiment of the concrete slabs used in accordance with the present invention; and FIG. 5 illustrates another embodiment of the concrete slabs used in accordance with the present invention.

DETAILED DESCRIPTION OF THE PREFERRED EMBODIMENT(S)

Referring to FIG. 2, the present invention involves the direct bonding of a ductile, cementitious "expansion strip" 10 between concrete slabs 12 or between a slab and a relatively non-movable abutting structure. The use of these ductile strips 10 can be with new construction of concrete construction or in the repair of preexisting concrete constructions. More specifically, the expansion strips 10 can be used in the construction and repair of transportation engineering structures such as highways, airport pavements, bridge decks, and building structures, such as factory and warehouse floors, buildings, and parking garages. The expansion strips 10 can also be used to replace older expansion joints in transportation engineering and building structures.

The term "cementitious" includes "concrete" and other building compositions which rely on hydraulic curing mechanisms, i.e., lime cement, portland cement, refractory cement, expanding cement, pozzolanic cement, etc. By "directly bonding" is meant bonding by direct contact of cementitious expansion strip material with the structural elements to be bonded together, or with the assistance of an adhesion promoter or adhesive which itself is incapable of providing the necessary changes in linear dimension expected during expansion and contraction of the structural elements. Elastomeric grouts such as butyl rubber, polysulfide rubber, etc., which are easily compressed and elastomeric are not of the type of constituent which may be used to directly bond adjacent structural elements. Examples of coatings which might be used include coatings of aminopropyltriakoxysilanes, rigid (essentially non-elastomeric) epoxy resins, and the like. Most preferably the direct bonding is accomplished by casting the ductile expansion strip either directly onto the respective spaced apart surfaces, or following treatment of these surfaces by air blasting, sand blasting, water jet, acid etching, etc. Application of an adhesive promoter such as γ-aminopropyltriethoxysilane, particularly from aqueous dispersion, is also a preferred embodiment. Attachment of a non-elastomeric material to the road bed, slab, etc., or to the ductile strip, which does not impede the function of the ductile strip, will also be considered "directly bonding." For example, adhesively bonding a stainless steel metal strip to the slab or to the ductile strip or both, followed by adhesively bonding any unbonded surface, such that tensile stress loads can be transmitted.

By "expansion strip" 10 is meant a fiber-reinforced, ductile cementitious composition which is molded between spaced apart, adjacent structural elements 12 so as to provide an element which can deform both under compression and tension, to absorb the respective compressional and tensile loadings which might otherwise cause the structural element to fracture. Elastomer grouts, fibrous board, etc., which are traditionally used in concrete structures have the ability to absorb compressive loads, but not tensile loads, as they are not linked to the abutting structures to facilitate being exposed to such loads.

As best shown in FIG. 3, the ductile cementitious expansion strips are composed of a fiber-reinforced cementitious composition. The fibers 16 are typically randomly oriented. The fibers 16 may be either hydrophobic and/or hydrophilic.

The fibers 16 preferably have a fiber modulus (E) of about 20–250 GPa, more preferably of about 30–150 GPa, and most preferably about 40–120 GPa. The fibers 16 preferably have a fiber tensile strength of about 500–4500 MPa, more preferably of about 900–3500 MPa, and most preferably of about 1000–3000 MPa. The fibers 16 preferably have a diameter of about 0.015–0.10 mm, more preferably of about 0.025–0.080 mm, and most preferably of about 0.030–0.050 mm. The fibers 16 preferably have a length of about 3–30 mm, more preferably of about 6–20 mm, and most preferably of about 10–15 mm. The volume percentage of the fibers 16 in the composition may range from 0.5–10 volume percent, more preferably 0.75–5 volume percent, and most preferably 1–2 volume percent. The amount must be effective to allow the expansion strip to behave in a ductile fashion in the contemplated end use.

By ductile fashion, it is meant that the material exhibits strain-hardening under uniaxial tension, with tensile strain capacity preferably of about 1–10%, and more preferably of about 2–8%, and most preferably of about 3–7%. During strain-hardening, microcracking may form. Such microcracking should be limited to preferably no more than 0.2 mm, more preferably no more than 0.1 mm, and most preferably no more than 0.06 mm.

The fiber-reinforced cementitious composition is prepared by mixing the ingredients together in any order provided that a ductile ECC is obtained. Typical ingredients include cement, sand, fly ash, setting retarding agents, setting accelerants, flow control agents, surfactants, etc., in addition to the necessary fiber reinforcement. A full description of ECC materials may be found in Li and Kanda, "Engineered Cementitious Composites For Structural Applications" ASCE J. MATERIALS IN CIVIL ENGINEERING, V. 10, No. 2, pp. 66–69. Reference may also be had to V. C. Li et al., "Conditions For Pseudo Strain-Hardening In Fiber Reinforced Brittle Matrix Composites, (HPFRCC 3), Reinhardt and Naaman, Ed.S., RILEM pp. 9–18 (1999).

It is also generally desirable that the material be self-compacting, if possible. Self compacting ECC may be prepared using hydrophilic fiber reinforcement, preferably PVA (polyvinylalcohol), as the fiber reinforcement in a self compacting cement. Generally less than 2 volume percent of fibers are used. See, e.g., A. Naaman "SIFCON: Tailored Properties For Structural Performance Proceedings, High Performance Fiber Reinforced Cement Composites (HPFRCC 2), Reinhardt and Naaman, Ed.S., RILEM pp. 18–38 (1992), which employs relatively large amounts of fiber in a non-self compacting formulation. See, also N. Nagamoto et al., "Mixture Properties Of Self-Compacting High Performance Concrete," HIGH-PERFORMANCE CONCRETE: DESIGN, MATERIALS, AND ADVANCES IN CONCRETE TECHNOLOGY, ACI International, SP-172, pp. 623–666, December 1997; and Okamura et al., "Mix Design For Self-Compacting Concrete," CONCRETE LIBRARY OF JSCE No. 25, pp. 107–120, 1995.

The interface between the ductile strips 10 and the concrete slabs 12 may be strengthened by reinforcing means, such as joining means like dowel bars 20 extending between and connecting the ductile strips and the adjacent concrete slabs.

In addition, the interfacial failure under tensile stress can also be avoided by introducing notches 22 at the base of the strips. The depth of the notch can be calibrated to the strength of the interface between the ductile strip and the concrete slab, and/or the tensile strength of the concrete slab.

The slabs 12 have a generally planar upper surface 24 and a generally lower surface 26. The ductile strip 10 has a generally planar upper surface 30, essentially parallel with upper surface 24, and opposed interface surfaces 32 in contacting relationship with interface surface 34 on opposed slabs 12. The interface surface of strip 10, relative to upper surface 24, is preferably between 5–90°, more preferably between 10–40°, and most preferably between 20–35°.

The ductile strip length and height should match the dimensions of the concrete slab. The width of the strip is preferably about 0.01 to 0.1 times the distance between adjacent strips, and more preferably about 0.02 to 0.07 times the distance between adjacent strips, and most preferably about 0.03 to 0.05 times the distance between adjacent strips.

The ductile strips 10 can be produced in a factory by cast or extrusion methods or cast directly on site by conventional means. If the ductile ECC is one of the self-compacting type, vibration may be reduced or eliminated prior to cure.

The expansion strip 10 is preferably poured or molded between spaced apart structural elements 12 and allowed to harden in situ. The spacing between structural elements, is equal to the width of the strip.

In order to perform its desired function, it is most desirable that the bonding of the expansion strip to the structural members have a large surface area. Thus, as shown in FIG. 4, the concrete slabs 11 may be molded or later sawn to have sloping, or stepped, sides 40 or, as shown in FIG. 5, a series of triangular grooves 42 essentially parallel to the edge of the slab or may take other shapes to increase surface area. This increased surface area is desired to ensure bonding between structural elements 12 and the composition of the expansion strip 10. For compositions exhibiting greater bonding capacity, the surface area may be lessened appropriately.

The ductile strips of the present invention may also be used advantageously to repair existing roadways, bridge decks, parking structure decks, etc. Generally speaking, any repair method may be used which allows the insertion of the ductile strip and its attachment to existing structures in a manner which insures that it can achieve the desired function of absorbing stress and compression loads. For example, an existing road bed, bridge deck, etc. may be sliced, for example by means of diamond saws and the like, generally in a direction transverse to the direction of vehicular traffic, and a strip of appropriate size, removed. Additional diamond saw(s) having their blade(s) directed parallel to the direction of the cut, but at an angle to the surface of the road bed may be used to provide interlocking groves, or a large interfacial angle to increase surface bonding area as hereinbefore described. In addition, or in lieu thereof, a boring machine may be used to bore holes into the concrete road bed to receive rods such as rebar or similar devices to insure connectivity between the existing road bed portions and the ductile strip. The ductile strip itself may be precast and inserted into the road bed using high strength adhesives such as epoxy resin adhesives, or preferably is cast directly into the area removed by the sawing operation. The casting method is particularly useful when connecting rods are employed or when the interface between the existing slab and the ductile strip contains undercuts which would not allow precast ductile strips to be inserted.

In use, the concrete slabs are poured in the normal manner, in a spaced apart relationship. If the forms at the slab edges do not have the necessary high surface area configuration, the slabs may have their "abutting" edges sawn to the correct pattern, i.e., with diamond saw(s). Alternatively, form work inclined at an angle (inclined to vertical) can be used to mold the slabs and ductile strip to achieve the high surface area. The expansion strip composition is then prepared and cast between the slabs, generally under normal pressure, and smoothed or troweled appropriately.

EXAMPLES

Strength Development of Ductile Material Under Uniaxial Tension

A ductile unit was prepared by mixing type I ordinary Portland cement and silica sand with approximate particle size 0.1 to 0.3 mm to form a matrix. Polyethylene fiber (Spectra 900) having the properties that are listed in Table 1 below was added to the matrix with the fiber.

TABLE 1

Properties of Spectra 900 Fiber Used

| Type | $E_f$ (GPa) | $\sigma_f$ (MPa) | $d_f$ (mm) | $L_f$ (mm) |
| --- | --- | --- | --- | --- |
| Polyethylene | 120 | 2700 | 0.038 | 19.05 |

The mix proportions are given in Table 2 below:

TABLE 2

Mix Proportions of Plain Concrete and Ductile Material, parts by weight

| Components | PC | Ductile Material |
| --- | --- | --- |
| Cement | 0.9 | 1 |
| Silica, fumed | 0.1 | — |
| Sand | 1.62 | 0.5 |
| Stone | 1.62 | — |
| Water | 0.475 | 0.32 |
| Superplasticizer | 0.005 | 0.02 |
| Methyl cellulose | — | 0.0007 |
| Anti-foamer | — | 0.0005 |
| Spectra (Polyethylene) fiber | — | 1.5% by volume |

Tensile specimen is made of the ductile material specified in Table 2 above in the form of a rectangular coupon of size 304.8×76.2×12.7 mm were molded. The molds used to cast the specimens were made of plexiglass. The mixing procedure of the composite material consists of the following steps.

(1) Matrix preparation: The matrix was prepared in a Hobart type mixer. First, the cement and silica sand were mixed together for 2 minutes at low speed. Then water containing superplasticizer (polymelamine) and thickening agent (methyl cellulose) was gradually added, and mixing was continued for 2 minutes, resulting in a uniform fluid matrix. Within this period, the bottom of the mixing bowl was manually scraped to ensure that no solid materials stuck to the bottom. After such scraping, the matrix was mixed at a higher speed for 1 minute before addition of fibers. (2) Addition of fibers: The fibers were gradually spread into the mixer by hand as the matrix was mixed at a slow speed. The fibers were added slowly to ensure proper distribution with no fibers bundled together. (3) Casting and curing: The composite material was carefully cast into the mold in two layers. First about half the material was placed in the mold. Then the mix was vibrated for about 1–2 minutes to ensure that the material was well compacted. Next, the second half of the mold was filled by the composite in the same manner. After smoothing the surface, the specimens were covered with a polyethylene sheet to prevent loss of moisture and stored for 24 hours at room temperature prior to demolding. Then all specimens were removed from their molds and put into water at 23° C. for curing until tensile testing was carried out.

The specimens were tested in uniaxial tension with displacement control in a 250 kN capacity MTS 810 material testing system with hydraulic wedge grips. Aluminum plates were epoxy glued onto the ends of the specimens to enhance the ends for gripping. The actuator displacement rate used for controlling the test was 0.0025 mm per second. The strain was measured by two linear variable differential transducers (LVDTs) mounted on the surface of the specimen. The measured gage length of LVDTs was 190 mm. The raw data consisted of time, load, position of the piston and displacement from each LVDT.

The corresponding first cracking strength and the ultimate tensile strength as well as the corresponding strain level are listed in Table 3. From these experimental results, first we can see that the strength development of the ductile material, both first cracking strength and ultimate tensile strength, is characterized by a fast development period, around 3 days which is the minimum curing time in the present study, followed by a relatively slow development period. Second, the ductile material already starts to show significant multiple cracking and strain-hardening behavior at 3 days water curing. However, the first crack strength and ultimate tensile strength slightly increase with the increase of curing time due to the development of cement hydration and its influence on the frictional stress between fiber and matrix. However, the rate of increase is lower than that of the plain concrete, as will be discussed below.

Strength Development of Plain Concrete Under Uniaxial Tension

Tensile strength development of concrete with curing time was used for studying the cracking behavior of ductile strips. Aluminum alloy holders were used to hold the samples, one fixed to the load cell and the other to the actuator with standard MTS grips. The tensile load was transmitted to the specimen by the anchor action between holders and the enlarged ends of the specimen. To further prevent failure due to stress concentration at the loaded ends of the concrete specimens, two steel bolts with 6 mm diameter and 12 mm length were used to reinforce the specimen ends. One end of each bolt was connected with a nut and the other end was fastened to a 118×45×7 mm steel plate through another nut. Thus the failure of the specimen under tensile load can be ensured to be within the central position with a uniform cross section. The minimum cross section of the specimen was 76×45 mm. The overall uniaxial tensile strain was measured with two LVDTs, one on each side of the specimen.

Type I ordinary Portland cement and silica fume, natural sand with approximate particle size 0.3 to 4 mm and crushed natural stone with maximum particle size 10 mm were used. The mix proportions have been provided previously.

TABLE 3

Summary of Tensile Test Results of Plain Concrete and Ductile Material

| | PC | Ductile Material | | |
|---|---|---|---|---|
| Time (days) | Ultimate tensile strength (MPa) | First crack strength (MPa) | Ultimate tensile strength (MPa) | Ultimate tensile strain (average %) |
| 3 | 2.25, 1.82 | 2.30, 2.50 | 3.44, 3.13 | 5.25 |
| 7 | 2.91, 3.93, 2.94 | 2.50, 2.65 | 4.00, 3.58 | 6.5 |
| 14 | — | 2.40, 2.50 | 4.56, 3.66 | 7.8 |
| 21 | 5.22, 4.77 | 3.70, 3.50 | 4.42, 4.61 | 6.5 |
| 28 | 5.40, 5.68 | 4.12, 3.88 | 4.56, 5.00 | 5.5 |

All tests were carried out under displacement control with prescribed rate of 0.005 mm per second in a 250 kN capacity MTS 810 material testing system. The tensile strength of concrete (PC) at different curing times is listed in Table 3 above. By comparing the results between plain concrete material and the ductile strips material, it can be found that at 3 days curing, there is almost no difference between the tensile strength of the plain concrete and the first cracking strength of the ductile material. However, after 3 days, the tensile strength of concrete develops at a faster rate than that of the ductile material, probably due to the contribution of the coarse aggregates. The tensile strength of concrete starts to overtake the first cracking strength of the ductile material after 3 days and to overtake the ultimate tensile strength of the ductile material after about 14 days. This means that after a certain curing period, first cracking will occur in the ductile material instead of in concrete for a specimen composed of the ductile material sandwiched between plain concrete sections with the same geometric dimensions, under uniaxial tensile load. These material characteristics are the basic requirements for the ductile strip design in this research. The plain concrete has high tensile strength with low strain capacity while the ductile material has high strain capacity with low tensile strength.

Testing of Concrete Construction Employing a Ductile Strip

Concrete constructions having ductile strips were tested. An interface angle of 30° between the concrete slab and the ductile strip was adopted. The same size of specimen as used in uniaxial tensile tests of plain concrete, discussed above, was used in these experiments. The width of the ductile strip was 10 mm.

In order to cast the concrete sections and the ductile strip at the same time and to ensure an inclined angle of 30° for the ductile strip/concrete interface, a special casting device was developed. The device consists of two vertical movable steel plates and another two movable steel plates which can slide along the direction with prescribed inclined angle. This is realized by fixing two polymeric foam blocks with a path for sliding of the steel plate along the designed angle. The width of the steel plates is fixed to the mold width. The polymeric foam blocks were fixed at the top of the mold by glue.

The specimen casting procedure can be described as follows. First, with the vertical and inclined steel plates in place, the fresh concrete and the ductile material are carefully cast into the plexiglass mold to form a 10 mm thick layer. Then the mold is vibrated for about half a minute. Next, the vertical steel plate is gradually raised until out of the layer with the vibrating table running. The concrete and the ductile material was then poured into respective sections to fill out the rest of the mold. The specimen is further vibrated and attention is paid to all corners of the mold until no more air comes out. Then, the inclined steel plates are slowly pulled out of the mold. During movement of the plate, the vibrating table is kept running to prevent induction of air. After that, vibration is continued for another minute. After smoothing the surface, the specimens are covered with a polyethylene sheet and stored for 24 hours at room temperature. Then the specimens are removed from their molds and put into water at 23° C. for curing until the date of testing. The specimens are cured for 28 days.

Cracking was successfully localized into the ductile strip instead of in the concrete section. With the present dimension of the specimen, the overall strain attained was 1.4% at peak load (3.5 MPa). No cracking in the concrete slabs were found.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A concrete construction comprising:
   a concrete slab; and
   a ductile strip adjacent a first side of the slab, the ductile strip comprising an engineered cementitious composite of cementitious material and reinforcing fibers, the ductile strip being directly bonded to the slab.

2. The construction of claim 1 wherein hydrophilic fibers comprising polyvinyl alcohol fibers are present in the ductile strip.

3. The construction of claim 1 wherein a further concrete slab is present wherein the first concrete slab is adjacent a first side of the ductile strip and the second concrete slab is adjacent a second side of the ductile strip.

4. The construction of claim 1 wherein the ductile strip has a first crack strength lower than the tensile strength of the concrete slab.

5. The construction of claim 4 wherein the tensile strain capacity of the ductile strip is about 1–10%.

6. The construction of claim 1 wherein at least one dowel bar is provided that extends between and connects the slab and the ductile strip.

7. The construction of claim 1 wherein the ductile strip has a base section having at least one notch.

8. The construction of claim 1 wherein the ductile strip has an upper surface generally planar with an upper surface of the slab, the strip further having an interface surface in contacting relation with an interface surface of the slab, the interface surface of the strip being at about 5–90° angle relative to the upper surface of the slab.

9. The construction of claim 1 wherein the concrete slab is made of a material having a tensile strain capacity of about 0.01–0.2% and the strip is made of a material having a tensile strain capacity of about 1–10%.

10. A method of making or repairing a concrete construction, said method comprising:

providing a ductile strip adjacent a concrete slab, wherein the ductile strip is made of an engineered cementitious composite comprising cementitious material and hydrophilic and/or hydrophobic reinforcing fibers.

11. The method of claim 10 wherein the ductile strip is provided between adjacent two slabs of concrete.

12. The method of claim 10 wherein the ductile strip is cast prior to being provided adjacent the slab of concrete.

13. The method of claim 10 wherein the ductile strip is cast adjacent the slab of concrete.

14. The method of claim 10 wherein the ductile strip has a first crack strength lower than the tensile strength of the concrete slab.

15. The method of claim 10 wherein hydrophilic fibers comprising polyvinyl alcohol are present in the ductile strip.

16. The construction of claim 1 wherein hydrophobic fibers comprising polyethylene are present in the ductile strip.

17. A roadbed suitable for vehicular traffic, said roadbed comprising a plurality of said slabs and said ductile strips of claim 1.

18. The roadbed of claim 17, where each ductile strip separates each slab of each adjacent pair of slabs.

19. A floor suitable for a parking structure, said floor comprising a plurality of said slabs and said ductile strips of claim 1, where each ductile strip separates each slab of each adjacent pair of slabs.

20. A floor suitable for a flat crack free factory or warehouse floor, said floor comprising a plurality of said slabs and said ductile strips of claim 1, where each ductile strip separates each slab of each adjacent pair of slabs.

21. The construction of claim 1, wherein the concrete slab is provided with grooved or stepped surfaces adjacent the ductile strip.

22. The method of claim 10, wherein the concrete slab is provided with grooved or stepped surfaces adjacent the ductile strip.

23. The construction of claim 1, wherein a second ductile strip is provided adjacent a second side of the slab, opposite the first side of the slab, each ductile strip having a width about 0.01–0.1 times the distance between the ductile strips.

24. The method of claim 10, wherein a second ductile strip is provided adjacent a second side of the slab, opposite the first side of the slab, each ductile strip having a width about 0.01–0.1 times the distance between the ductile strips.

25. A concrete bridge deck, said bridge deck comprising a plurality of said slabs and said ductile strips of claim 1, where each ductile strip separates each slab of each adjacent pair of slabs.

26. A method of repairing concrete structure comprising a plurality of concrete slabs and expansion strips separating the concrete slabs, said method comprising:

providing a ductile strip between the adjacent concrete slabs of the pair of concrete slabs where an expansion strip was, wherein the ductile strip is made of an engineered cementitious composite comprising cementitious material and hydrophilic and/or hydrophobic reinforcing fibers.

27. The construction of claim 3 wherein each slab has essentially the same shape.

28. The construction of claim 27 wherein each slab has an essentially uninterrupted quadrilateral upper surface.

29. The construction of claim 3 wherein the first and second sides of the strip extend essentially the length of the slabs.

30. The construction of claim 3 wherein a second ductile strip is present adjacent a second side of the second slab and a third concrete slab is present adjacent the second ductile strip, each ductile strip having a width about 0.01–0.1 times the distance between the ductile strips.

31. A concrete construction comprising:

a plurality of essentially uniformly shaped concrete slabs; and a plurality of spaced apart and essentially parallel ductile strips made of an engineered cementitious composite comprising cementitious material and hydrophilic reinforcing fibers, each set of the slabs being separated by one of the strips such that each ductile strip has a width about 0.01–0.1 times the distance between adjacent ductile strips.

32. The construction of claim 31 wherein no ductile strips are present that extend in an essentially perpendicular manner with respect to any of the ductile strips.

33. The construction of claim 5 wherein the ductile strip exhibits strain-hardening under uniaxial tension.

34. The construction of claim 33 wherein the reinforcing fibers have a fiber modulus (E) of about 20–250 GPa.

35. The construction of claim 34 wherein the fibers have a fiber tensile strength of about 500–4500 MPa.

36. The construction of claim 35 wherein the fibers have a diameter of about 0.015–0.10 mm and a length of about 3–30 mm.

37. The construction of claim 36 wherein the volume percent of the fibers in the cementitious composition ranges from 0.5 to 10 volume percent.

38. The construction of claim 36 wherein the fibers comprise hydrophobic fibers.

39. The construction of claim 38 wherein the fibers further comprise hydrophilic fibers.

40. The construction of claim 39 wherein the reinforcing fibers are randomly intermixed throughout the engineered cementitious composite.

41. The construction of claim 1 wherein the ductile strip has the same thickness as the concrete slab.

42. The construction of claim 1 wherein the cementitious material further comprises sand and fly ash.

* * * * *